No. 633,063. Patented Sept. 12, 1899.
R. C. AYTON.
STEERING APPARATUS FOR CYCLES.
(Application filed June 23, 1899.)
(No Model.)
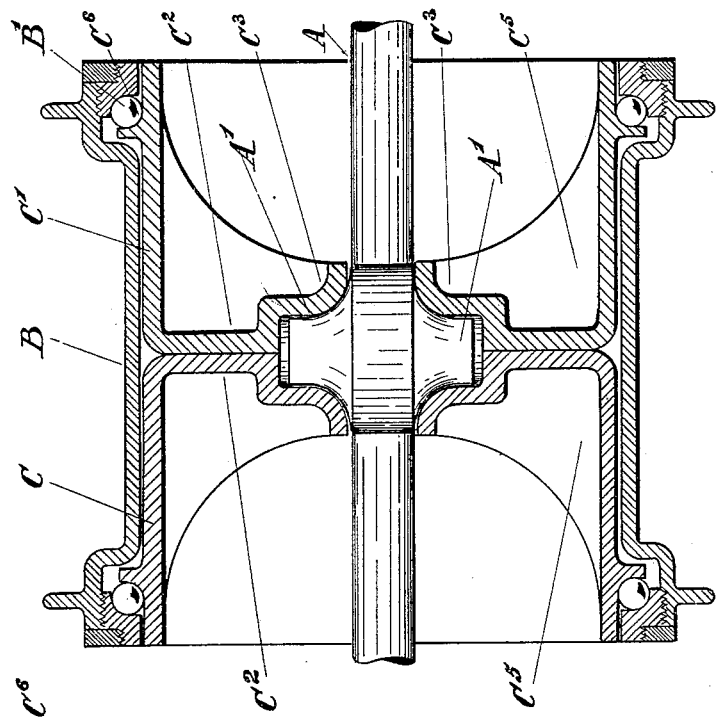
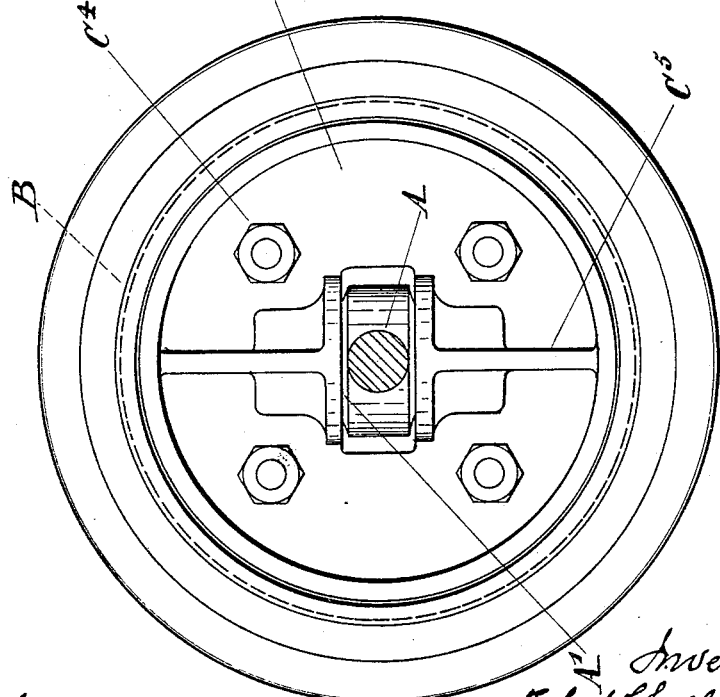
Witnesses
Arthur A. Fisher
J. G. Hinkel
Inventor
Robert Charles Ayton
by Foster Freeman
Attorneys.
THE NORRIS PETERS CO., PHOTO-LITHO., WASHINGTON, D. C.

UNITED STATES PATENT OFFICE.

ROBERT CHARLES AYTON, OF COVENTRY, ENGLAND.

STEERING APPARATUS FOR CYCLES.

SPECIFICATION forming part of Letters Patent No. 633,063, dated September 12, 1899.

Application filed June 23, 1899. Serial No. 721,577. (No model.)

*To all whom it may concern:*

Be it known that I, ROBERT CHARLES AYTON, a subject of the Queen of England, residing at Coventry, Warwick county, England, have invented certain new and useful Improvements in or Relating to Steering Apparatus for Cycles, Motor-Vehicles, and the Like, (for which I have made application for Letters Patent in Great Britain, No. 17,439, dated the 12th day of August, 1898,) of which the following is a specification.

This invention relates to steering apparatus for cycles, motor-vehicles, and the like, and has for its object to so mount the steering wheel or wheels that increased facilities are afforded for guiding the vehicle.

According to this invention the hub of each wheel is made of sufficiently large diameter to allow of the inner or fixed portion being in the form of a sleeve, within which are arranged bearings for the accommodation of vertical bearing-pins formed upon the main axle, the axis of these pins being at right angles to that of the axle. With this arrangement the wheel turns upon the axle about a center situated in or about the central plane of the wheel.

Where two steering-wheels are employed, as in some forms of vehicle, the inner non-rotatable sleeves of the wheels are connected together in some suitable manner, so as to enable the two wheels to be turned simultaneously. It is to be understood, however, that any suitable device may be employed for actually bringing about the guidance of the wheel or wheels, the manner of mounting above described giving facility for great variation in this direction.

It has before now been proposed to pivot a wheel internally somewhat after the manner proposed in the present specification, but upon the end of a shaft. In such a construction, however, the drawbacks inseparable from an overhung axle were incurred and the possibility appertaining to my invention of carrying the wheel in a fork or in the center of a long shaft would not exist. Consequently I make no broad claim to the pivoting of a wheel inside its hub.

In the accompanying drawings, Figure 1 is a vertical longitudinal section through the hub of a wheel constructed and mounted in accordance with this invention. Fig. 2 is an end view of the same.

Like letters indicate like parts throughout the drawings.

The axle A, whose ends are suitably attached to the framework of the vehicle, is provided with pivot-pins A', whose axis is at right angles to the axis of the axle. The hub B of the wheel is made of larger diameter than is usual and provided with ball-races B' at either end of some convenient construction. Within the hub B is arranged a sleeve formed in two parts C C', each of which has an internal flange $C^2$. In the latter are formed semicylindrical recesses $C^3$ for the reception of the pivot-pins A', the two parts C C', when brought together and connected by bolts $C^4$, embracing the pivot-pins in the manner shown in the drawings. Webs $C^5$ serve to strengthen the flanges $C^2$ where the recesses are formed. Each portion of the sleeve C C' is provided with a ball-race $C^6$.

The ends of the axle A may be mounted on springs or otherwise, as found convenient.

If preferred, the construction above described may be modified by forming the sleeve C C' in one piece and providing it with pivot-pins adapted to engage with sockets formed in a two-part sleeve mounted upon the axle.

I claim—

The combination with a wheel-axle supported at both ends and provided with pivot-pins rigid therewith and extending at right angles thereto, of a two-part casing divided in a vertical plane and fitted over the axle, each part provided with recesses which register when the two parts are brought together and form sockets to receive the pins, said casing being free to turn horizontally on the pins, means to clamp the two parts together, and a wheel-hub mounted on the casing to turn horizontally therewith and also to rotate thereon in a vertical plane, substantially as set forth.

In testimony whereof I have hereto set my hand in the presence of the two subscribing witnesses.

ROBERT CHARLES AYTON.

Witnesses:
B. E. DUNBAR KILBURN,
HARRY B. RIDGE.